(12) United States Patent
Osunkwo et al.

(10) Patent No.: US 12,384,034 B2
(45) Date of Patent: Aug. 12, 2025

(54) PART MANIPULATOR FOR ASSEMBLY MACHINE

(71) Applicants: TE Connectivity Solutions GmbH, Schaffhausen (CH); Tyco Electronics (Shanghai) Co., Ltd., Shanghai (CN)

(72) Inventors: Sonny O. Osunkwo, Harrisburg, PA (US); Pablo Plascencia, Middletown, PA (US); Xianghao Bao, Shanghai (CN); Kellen Haile, Middletown, PA (US); Roberto Francisco-Yi Lu, Bellevue, WA (US); Swapnilsinh Solanki, Harrisburg, PA (US); Du Wen, Reading, PA (US); Dongfang Zong, Shanghai (CN)

(73) Assignees: TE Connectivity Solutions GmbH (CH); Tyco Electronics (Shanghai) Co Ltd (CN)

( * ) Notice: Subject to any disclaimer, the term of this patent is extended or adjusted under 35 U.S.C. 154(b) by 252 days.

(21) Appl. No.: 18/326,106

(22) Filed: May 31, 2023

(65) Prior Publication Data

US 2024/0269848 A1  Aug. 15, 2024

(51) Int. Cl.
*B25J 9/16* (2006.01)
*B25J 15/00* (2006.01)

(52) U.S. Cl.
CPC ........... *B25J 9/1669* (2013.01); *B25J 9/1661* (2013.01); *B25J 9/1697* (2013.01); *B25J 15/0028* (2013.01); *B25J 15/0052* (2013.01)

(58) Field of Classification Search
CPC ...... B25J 9/1669; B25J 9/1661; B25J 9/1697; B25J 15/0028; B25J 15/0052; B25J 15/0061; B25J 9/1612; B25J 9/1687; B23P 19/007
See application file for complete search history.

(56) References Cited

U.S. PATENT DOCUMENTS

| | | | |
|---|---|---|---|
| 10,954,081 B1 * | 3/2021 | Sun | B25J 9/1653 |
| 2015/0276549 A1 * | 10/2015 | Lazic | B23F 23/02 209/552 |
| 2023/0182313 A1 * | 6/2023 | Nielsen | B25J 15/0061 700/259 |
| 2023/0405842 A1 * | 12/2023 | Khin | B25J 15/12 |

* cited by examiner

*Primary Examiner* — Jonathan L Sample
*Assistant Examiner* — Sagar Kc

(57) ABSTRACT

A part manipulator an end effector coupled to a distal end of a robot arm. The end effector includes first and second clamp assemblies coupled to a frame. The first clamp assembly includes a first part gripper configured to pick a first part. The second clamp assembly includes a second part gripper configured to pick a second part. The second part gripper is movable relative to the frame in an actuation direction between a retracted position and an extended position. The second part gripper is located a second distance from the distal end of the robot arm in the retracted position. The second part gripper is located a third distance from the distal end of the robot arm in the extended position greater than the second distance.

20 Claims, 7 Drawing Sheets

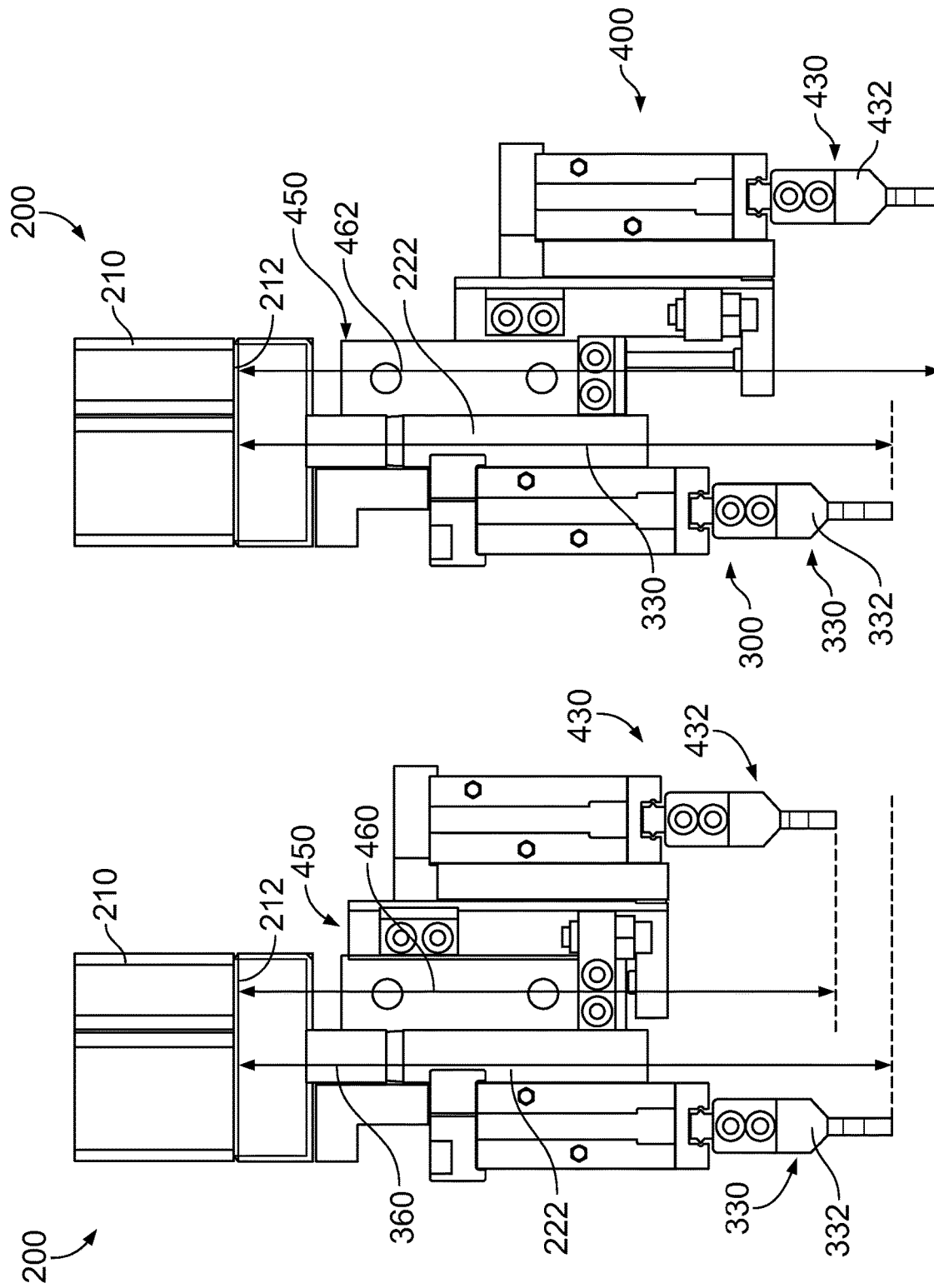

PART MANIPULATOR FOR ASSEMBLY MACHINE

CROSS REFERENCE TO RELATED APPLICATIONS

This application claims benefit to Chinese Application No. 202310121284.9, filed 15 Feb. 2023, the subject matter of which is herein incorporated by reference in its entirety.

BACKGROUND OF THE INVENTION

The subject matter herein relates generally to part assembly machines.

Part assembly machines are used to assemble parts into products using machine building processes rather than manual, hand building processes. Part assembly machines reduce assembly time and cost. However, automated assembly are not without disadvantages. For instance, pick and place machines have cycle times in moving the parts between the pick location and the place location. Time is wasted in orienting the gripper head and in transitioning between the pick location and the place location. Such transitions take time and reduce throughput of the part assembly machine.

A need remains for a part assembly machine that may be operated in a cost effective and reliable manner.

BRIEF DESCRIPTION OF THE INVENTION

In one embodiment, a part manipulator is provided and includes a robot arm movable in three dimensional space. The robot arm is movable between a pick station and a place station. The part manipulator includes an end effector coupled to a distal end of the robot arm. The end effector includes a frame, a first clamp assembly coupled to the frame, and a second clamp assembly coupled to the frame. The first clamp assembly includes a first part gripper configured to pick a first part. The first part gripper is located a first distance from the distal end of the robot arm to pick the first part. The second clamp assembly includes a second part gripper configured to pick a second part. The second part gripper is movable relative to the frame in an actuation direction between a retracted position and an extended position. The second part gripper is located a second distance from the distal end of the robot arm in the retracted position. The second distance is less than the first distance. The second part gripper is located a third distance from the distal end of the robot arm in the extended position. The third distance is greater than the second distance. The second part gripper is configured to pick the second part when the second part gripper is in the extended position.

In another embodiment, a part assembly machine is provided and includes a pick station having a part feeder. The part feeder has a platform supporting parts include a first part and a second part. The part assembly machine includes a vision inspection station positioned adjacent the part feeder. The vision inspection station includes an imaging device to image the first part and the second part in a field of view above the platform. The part assembly machine includes a controller receiving images from the imaging device. The controller determines locations of the first part and the second part on the platform. The part assembly machine includes a part manipulator positioned adjacent the pick station to successively pick up the first part and the second part from the part feeder and configured to successively place the first part and the second part at a place station. The part manipulator includes a robot arm and an end effector is coupled to a distal end of the robot arm. The robot arm operably coupled to the controller. The robot arm is movable in three dimensional space between the pick station and the place station. The end effector operably coupled to the controller. The end effector includes a frame, a first clamp assembly coupled to the frame, and a second clamp assembly coupled to the frame. The first clamp assembly includes a first part gripper configured to pick the first part. The first part gripper is located a first distance from the distal end of the robot arm to pick the first part. The second clamp assembly includes a second part gripper configured to pick the second part. The second part gripper is movable relative to the frame in an actuation direction between a retracted position and an extended position. The second part gripper is located a second distance from the distal end of the robot arm in the retracted position. The second distance is less than the first distance. The second part gripper is located a third distance from the distal end of the robot arm in the extended position. The third distance is greater than the second distance. The second part gripper is configured to pick the second part when the second part gripper is in the extended position. The controller operates the robot arm to successively position the end effector relative to the first part and the second part. The controller operates the first clamp assembly to pick up the first part at the pick station when the first part gripper is aligned with the first part. The controller operates the second clamp assembly to move the second part gripper to the extended position to pick up the second part at the pick station when the second part gripper is aligned with the second part. The controller operates the robot arm to move the end effector to the place station after the first part and the second part are picked up. The controller operates the end effector to successively release the first part and the second part at the place station.

In a further embodiment, a method of assembling parts is provided and includes loading parts, including a first part and a second part, on an upper surface of a platform of a part feeder. The method images the first part and the second part on the platform using an imaging device. The method processes images to determine positions of the first part and the second part on the platform. The method successively picks up the first part and the second part using a part manipulator includes a robot arm is movable in three dimensional space and an end effector is coupled to a distal end of the robot arm that includes a frame, a first clamp assembly coupled to the frame to pick the first part, and a second clamp assembly coupled to the frame to pick the second part. The first clamp assembly includes a first part gripper is located a first distance from the distal end of the robot arm. The second clamp assembly includes a second part gripper movable relative to the frame in an actuation direction between a retracted position and an extended position. The second part gripper is located a second distance less than the first distance from the distal end of the robot arm in the retracted position. The second part gripper is located a third distance greater than the second distance from the distal end of the robot arm in the extended position. The method operates the robot arm to move the end effector and the first and second parts to a place station and operates the end effector to release the first and second parts at the place station.

BRIEF DESCRIPTION OF THE DRAWINGS

FIG. 6 is a rear view of a portion of the part manipulator in accordance with an exemplary embodiment showing the second part gripper in a retracted position.

FIG. 7 is a rear view of a portion of the part manipulator in accordance with an exemplary embodiment showing the second part gripper in an extended position.

DETAILED DESCRIPTION OF THE INVENTION

Figure 1:
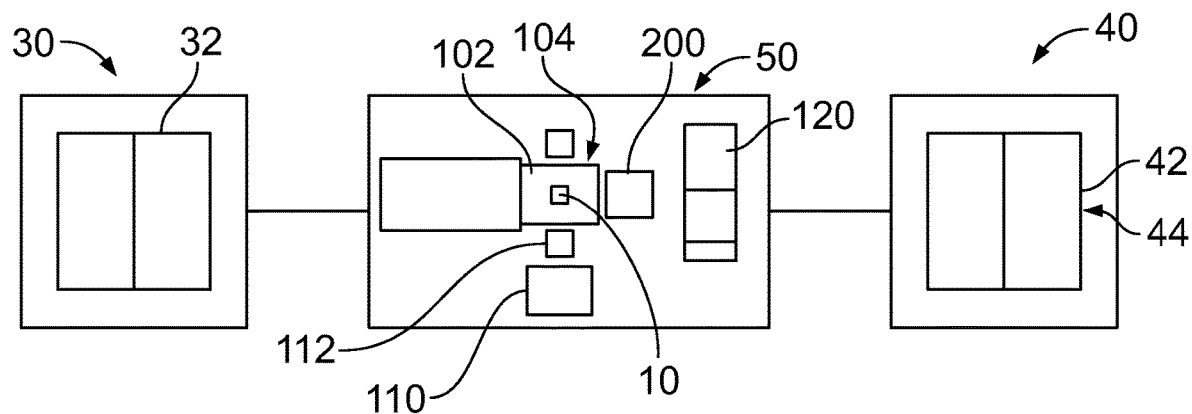
FIG. 1 is a schematic illustration of a part assembly machine for assembling parts, such as parts used to form electrical connectors in accordance with an exemplary embodiment.

FIG. 1 is a schematic illustration of a part assembly machine 100 for assembling parts 10, such as parts used to form electrical connectors. For example, the parts 10 may be contacts, housings, gaskets, seals, wires, circuit boards, or other types of parts. The part assembly machine 100 may be used for assembling products used in other industries. The part assembly machine 100 includes one or more forming machines 30 at a forming station 32 used to form various parts 10. For example, the forming machines 30 may include a molding machine, a press, a lathe, and the like. The part assembly machine 100 includes one or more processing machines 40 at a processing station 42 used for processing the various parts 10. For example, the processing station 42 may include an assembly station, a part loading station, a part soldering station, a part termination station, a part packaging station, and the like. The processing machine defines a place station 44 for placing the parts 10, such as in another product, on another product, or in a package.

The part assembly machine 100 includes a part feeder 102 that supports the parts 10, such as for transport and/or inspection between the forming machine 30 and the processing machine 40. The part feeder 102 is used to feed or move the parts 10 through the part assembly machine 100. In an exemplary embodiment, the parts 10 may be loaded onto the part feeder 102. The part assembly machine 100 is able to support the parts 10 without the need for fixturing, which increases the throughput of the parts 10 through the part assembly machine 100. The parts 10 are picked up from the part feeder 102. As such, the part feeder 102 defines a pick station 50, at which the parts 10 are picked.

In an exemplary embodiment, the part assembly machine 100 includes a vision inspection station 110 having one or more imaging devices 112 that image the parts 10 on the part feeder 102 within a field of view of the imaging device(s) 112. In the illustrated embodiment, the vision inspection station 110 includes multiple imaging devices 112 for imaging different sides of the parts 10. The imaging device 112 is able to image the parts 10 in the random orientations. In an exemplary embodiment, the vision inspection station 110 may be used to inspect different types of parts 10. For example, the vision inspection station 110 may be used to inspect different sized parts, different shaped parts, parts in different orientations, and the like.

In an exemplary embodiment, the part assembly machine 100 includes a controller(s) 120 for controlling operation of the various components of the part assembly machine 100. The controller 120 receives the images from the imaging device 112 and processes the images to determine inspection results. For example, the controller 120 determines the positions and/or orientations of each of the parts 10 on the parts feeder 102. The controller 120 may inspect the parts, such as for quality and may reject parts that are defective. In an exemplary embodiment, the controller 120 includes a shape recognition tool configured to determine the positions and/or orientations of the parts 10 in the field of view on the parts feeder 102. The images may be processed by performing pattern recognition of the images based on an image analysis model. The shape recognition tool may compare shapes, patterns or features in the images to shapes, patterns or features in the image analysis model. The images may be processed by performing feature extraction of boundaries and surfaces detected in the images and comparing the boundaries and surfaces to the image analysis model. The controller 120 may identify lines, edges, bridges, grooves, or other boundaries or surfaces within the image. The processing of the images may provide image contrast enhancement for improved boundary or surface identification. In an exemplary embodiment, the controller 120 includes an artificial intelligence (AI) learning module used to customize and configure image analysis based on the images received from the imaging device 112. The controller 120 may be updated and trained in real time during operation of part assembly machine 100. For example, the AI learning module may update and train the controller 120 in real time during operation of the vision inspection station 110.

The vision inspection station 110 includes a part manipulator 200 for moving the parts 10, such as from the parts feeder 102 to the processing machine 40, based on the inspection results. For example, the part manipulator 200 may pick up the parts 10 from the parts feeder 102 and place the parts 10 at the processing machine 40, such as for assembly. In an exemplary embodiment, the part manipulator 200 may be a multi-axis robot manipulator configured to grip and pick the parts off of the parts feeder 102 and move the parts 10 in three-dimensional space. In an exemplary embodiment, the part manipulator 200 is configured to simultaneously move multiple parts 10 (for example, a first part and a second part) from the pick station 50 to the place station 44. The part manipulator 200 improves efficiency by picking multiple parts 10 and simultaneously transitioning multiple parts between the pick station 50 and the place station 44 by reducing the number of transitions into/out of the parts feeder 102 and/or the processing machine 40. In various embodiments, the part manipulator 200 may improve cycle time up to 80% compared to part manipulators that move a single part.

Figure 2:
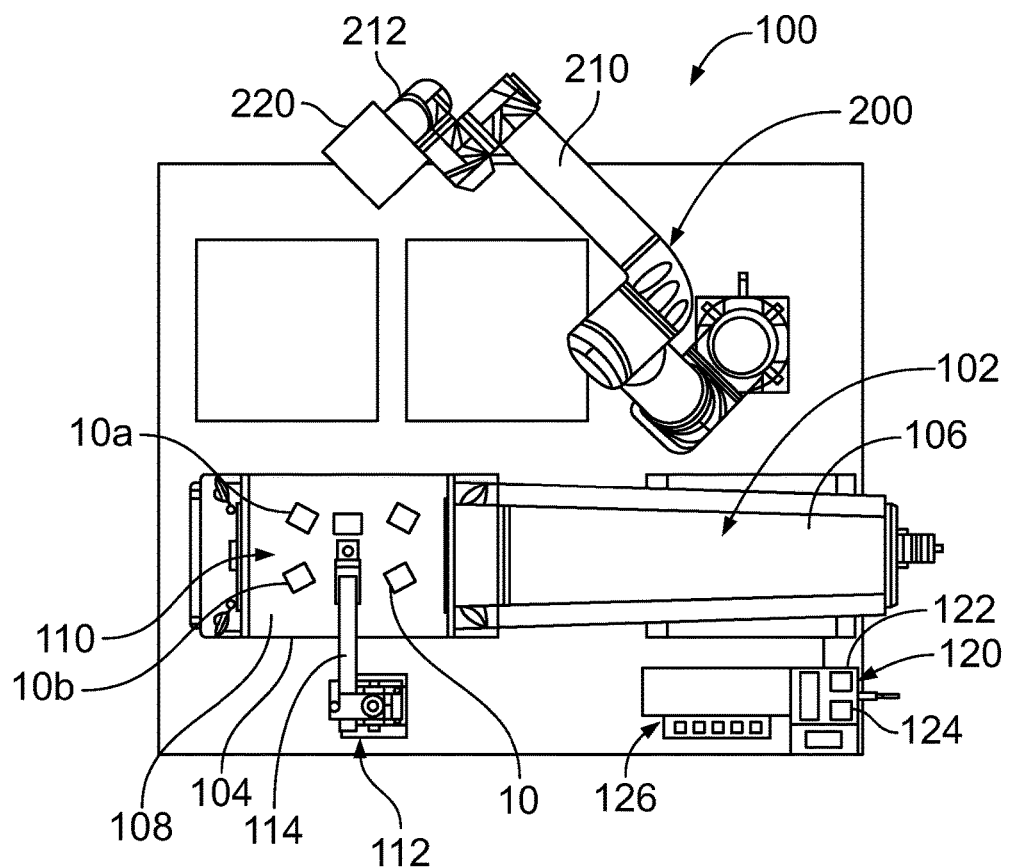
FIG. 2 is a top view of the part assembly machine in accordance with an exemplary embodiment.

FIG. 2 is a top view of the part assembly machine 100 in accordance with an exemplary embodiment. The part assembly machine 100 includes the parts feeder 102, the vision inspection station 110, the controller 120, and the part manipulator 200.

In an exemplary embodiment, the parts feeder 102 includes a platform 104 and a part feeding device 106. The parts 10 are loaded onto the platform 104 by the part feeding device 106, which may include a hopper, a conveyor, a robot, or another type of feeding device. The parts 10 are presented to the inspection station 110 on the platform 104. The parts 10 may be advanced or fed along the platform 104, such as by vibration of the platform 104. The parts 10 are removed from the platform 104 by the part manipulator 200. The platform 104 may include a plate having an upper surface 108 used to support the parts 10. The platform 104 may be a vibration tray that is vibrated to advance the parts 10. The platform 104 may be rectangular. However, the platform 104 may have other shapes in alternative embodiments, such as a round shape. The platform 104 may rotate.

The inspection station 110 includes one or more imaging devices 112 (a single imaging device 112 is illustrated in FIG. 2) arranged adjacent the platform 104. The imaging device 112 may be located above the upper surface 108 and view the parts 10 arranged on the upper surface 108. The imaging device 112 may be a camera, such as a visible light camera, an infrared camera, and the like. The field of view of the imaging device 112 may include the entire surface of the platform 104. The field of view may include at least a first part 10a and a second part 10b. The imaging device 112 may be mounted to a position manipulator 114 for moving the imaging device 112 relative to the platform 104. The position manipulator 114 may be an arm or a bracket that supports the imaging device 112. In various embodiments, the position manipulator 114 may be positionable in multiple directions, such as in two-dimensional or three-dimensional space. The position manipulator 114 may be automatically adjusted, such as by the controller 120, to control positioning of the position manipulator 114. In other various embodiments, the position manipulator 114 may be manually adjusted. The position of the imaging device 112 may be adjusted based on the types of parts 10 being imaged. For example, when a different type of part 10 is being imaged, the imaging device 112 may be moved based on the type of part being imaged.

The part manipulator 200 is positioned adjacent the platform 104. The part manipulator 200 is used to pick up the parts 10, such as the first part 10a and the second part 10b, and move the parts 10a, 10b to the place station 44 (shown in FIG. 1). The part manipulator 200 picks up the parts 10 based on input from the imaging device 112. In an exemplary embodiment, the part manipulator 200 includes a robot arm 210 and an end effector 220 at a distal end 212 of the robot arm 210. The end effector 220 may be a mechanical gripper or vacuum gripper configured to pick up the part 10. In various embodiments, the robot arm 210 is a four-axis robot arm or a six-axis robot arm. Other types of robot arms may be used in alternative embodiments. The parts 10 are picked up off of the platform 104 by the end effector 220. The parts feeder 102 may be operated to change the positions and/or orientations of the parts 10, such as vibrating the platform 104 to change the positions and/or orientations of the parts 10. The part manipulator 200 may then be operated again to pick up the newly positioned parts 10.

The controller 120 includes one or more processors 122 for processing the images. The controller 120 is operably coupled to the imaging device 112 and the part manipulator 200 for controlling operation of the part manipulator 200. The imaging device 112 communicates with the controller 120 through machine vision software to process the data, analyze results, record findings, and make decisions based on the information. The controller 120 provides consistent and efficient inspection automation. The controller 120 determines the positions of the parts 10 to determine which parts 10 are ready to be picked and placed by the part manipulator 200. The controller 120 controls operation of the part manipulator 200 based on the identified locations (x, y, z) and orientations (for example, heading and facing directions) of the parts 10. The controller 120 includes a communication module 124 for communicating with the various components of the part assembly machine 100. The communication module 124 may communicate via wired connections or wireless communication. In an exemplary embodiment, the controller 120 includes a user interface 126. The user interface 126 includes a display, such as a monitor. The user interface 126 includes one or more inputs, such as a keyboard, a mouse, buttons, and the like. An operator is able to interact with the controller 120 with the user interface 126.

Figure 3:
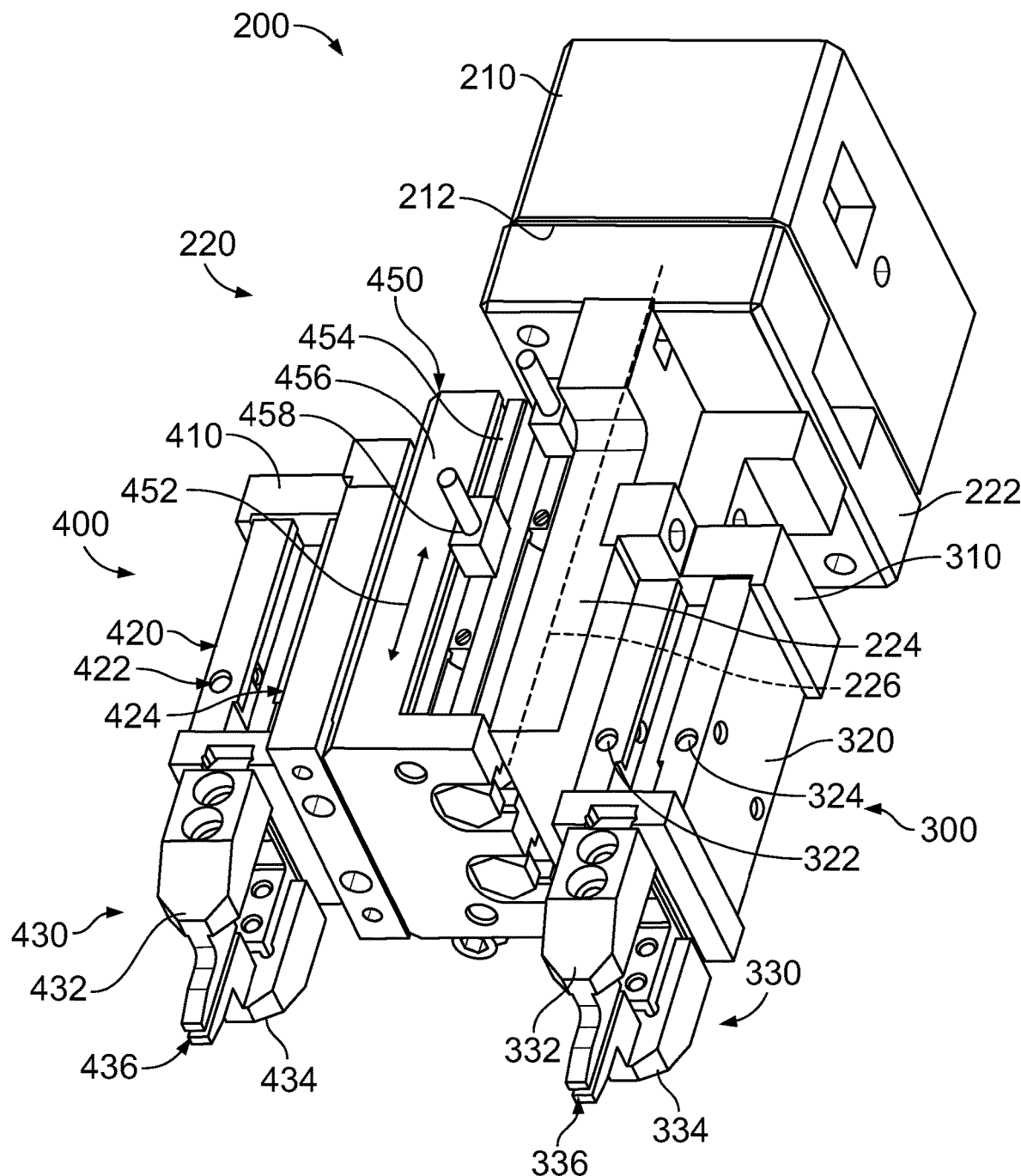
FIG. 3 is a front perspective view of a portion of the part manipulator in accordance with an exemplary embodiment.
Figure 5:
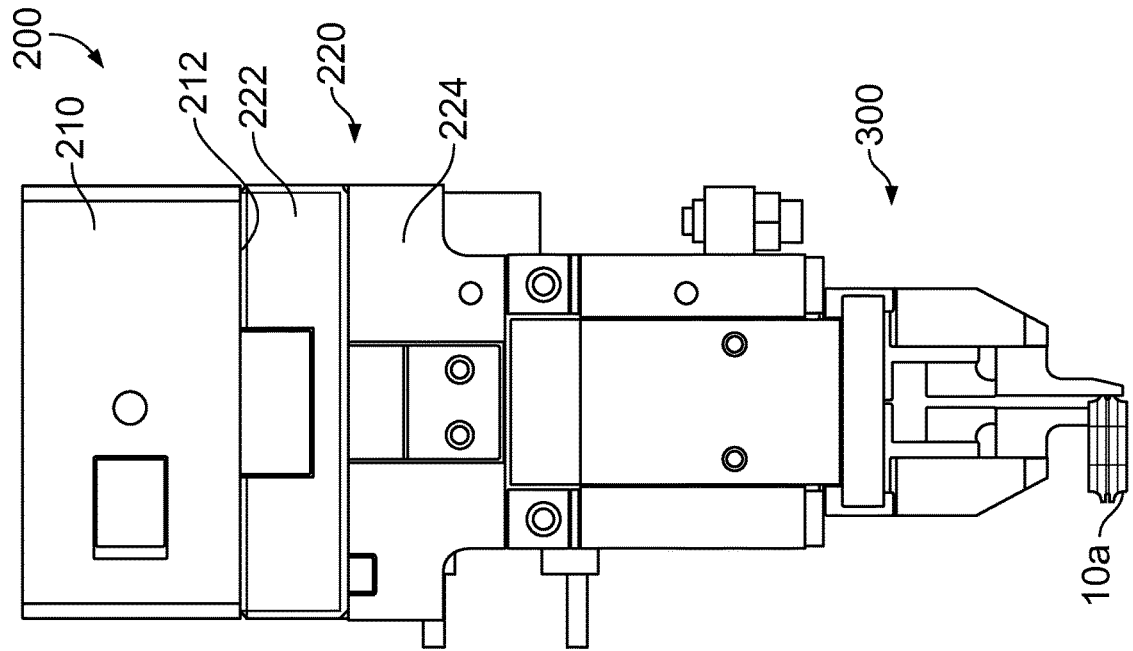
FIG. 5 is a side view of a portion of the part manipulator in accordance with an exemplary embodiment.
Figure 4:
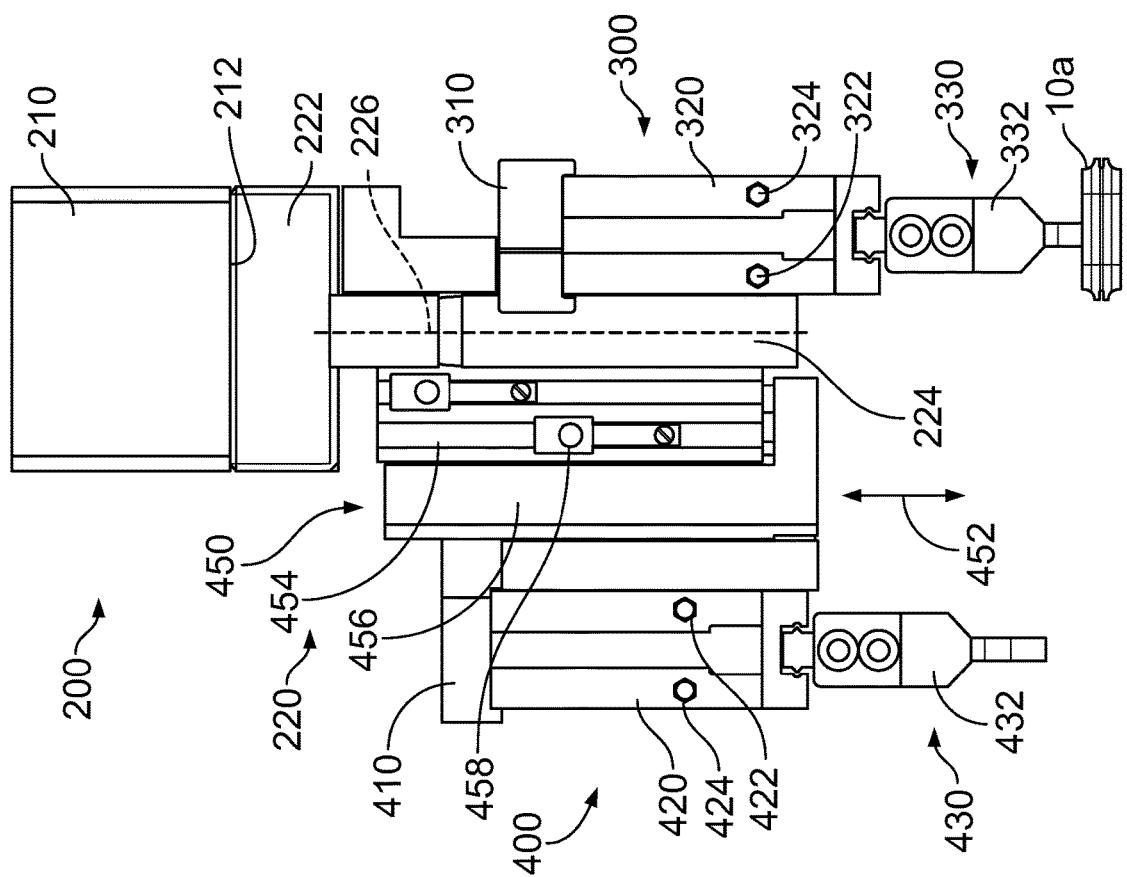
FIG. 4 is a front view of a portion of the part manipulator in accordance with an exemplary embodiment.

FIG. 3 is a front perspective view of a portion of the part manipulator 200 in accordance with an exemplary embodiment. FIG. 4 is a front view of a portion of the part manipulator 200 in accordance with an exemplary embodiment. FIG. 5 is a side view of a portion of the part manipulator 200 in accordance with an exemplary embodiment. FIGS. 3-5 illustrate the end effector 220 provided at the distal end 212 of the robot arm 210. FIGS. 4-5 show the end effector 220 holding one of the parts 10.

In an exemplary embodiment, the end effector 220 includes a mounting bracket 222 and a frame 224 extending from the mounting bracket 222. The end effector 220 includes a first clamp assembly 300 for picking the first part 10a and a second clamp assembly 400 for picking the second part 10b. The end effector 220 may include additional clamp assemblies for picking additional parts 10. The end effector 220 is moved in three-dimensional space by the robot arm 210.

The mounting bracket 222 is configured to be mounted to the distal end 212 of the robot arm 210. In various embodiments, the mounting bracket 222 is manufactured from a metal material, such as steel. The mounting bracket 222 may be machined to include openings, slots, or other features used to support the components of the end effector 220, such as the frame 224. The mounting bracket 222 may be secured to the robot arm 210 using bolts, latches, clips, or other mounting features.

The frame 224 includes one or more plates of other structural components used to support the components of the end effector 220. In various embodiments, the frame 224 is manufactured from a metal material, such as steel. The frame 224 may be machined to include openings, slots, or other features used to support the components of the end effector 220. The frame 224 may be secured to the mounting bracket 222 using bolts, latches, clips, or other mounting features. In various embodiments, the frame 224 extends generally perpendicular to the mounting bracket 222. For example, the mounting bracket 222 may be oriented horizontally and the frame 224 extends generally vertically along a frame axis 226.

The first clamp assembly 300 is coupled to a first side of the frame 224. The first clamp assembly 300 includes a first clamp mount 310, a first clamp actuator 320, and a first part gripper 330. The first clamp mount 310 is used to mount the first clamp assembly 300 to the frame 224, such as using fasteners. In various embodiments, the first clamp mount 310 is coupled directly to the frame 224. The first clamp mount 310 may be fixed relative to the frame 224. However, in alternative embodiments, an intervening structure may be provided between the first clamp mount 310 and the frame 224. Such intervening structure may be an actuator that moves the first clamp mount 310 relative to the frame 224, such as in a vertical direction to allow movement of the first part gripper 330 relative to the frame 224.

The first clamp actuator 320 is coupled to the first clamp mount 310. In various embodiments, the first clamp actuator 320 is a pneumatic actuator having flow ports 322, 324, which may be connected to pneumatic lines, to allow air flow through the first clamp actuator 320 to control operation of the first clamp actuator 320. In alternative embodiments, the first clamp actuator 320 is a hydraulic actuator or an electric actuator. The first part gripper 330 is coupled to the first clamp actuator 320. The first clamp actuator 320 is operated to actuate the first part gripper 330.

In an exemplary embodiment, the first part gripper 330 is used to mechanically pick up and hold the part 10, such as for movement of the part 10 from the parts feeder 102 to the assembly station at the processing machine 40. In the illustrated embodiment, the first part gripper 330 includes a first gripper jaw 332 and a second gripper jaw 334 that may be opened and closed relative to each other. A holding space 336 is defined between the first and second gripper jaws 332, 334. The part 10 may be held in the holding space 336 between the first and second gripper jaws 332, 334. In an exemplary embodiment, the first clamp actuator 320 is operated to cause the first part gripper 330 to pickup and release the part 10. The first clamp actuator 320 is operably coupled to the first gripper jaw 332 and/or the second gripper jaw 334 to open and close the first part gripper 330 for pickup and release of the part 10. Other types of grippers may be used in alternative embodiments to pick up and hold the part 10. For example, the first part gripper 330 may include vacuum elements used to hold the part 10 by vacuum pressure.

In an exemplary embodiment, the first clamp actuator 320 is operably coupled to the first part gripper 330 to move the first part gripper 330 between a releasing position and a holding position. For example, the first gripper jaw 332 and/or the second gripper jaw 334 may be moved toward each other as the first part gripper 330 is moved to the holding position. The first part gripper 330 is configured to hold the part 10 in the holding position. The first gripper jaw 332 and/or the second gripper jaw 334 may be moved away from each other as the first part gripper 330 is moved to the releasing position. The first part gripper 330 releases the part 10 when moved to the releasing position.

In an exemplary embodiment, the first clamp actuator 320 includes a gripper sensor 326 used for detecting a position of the first part gripper 330 relative to the part 10. The gripper sensor 326 may be provided in the holding space 336 between the gripper jaws 332, 334 to sense positions of the gripper jaw(s) 332, 334. The gripper sensor 326 may detect the presence of the part 10 in the holding space 336. The gripper sensor 326 may be a proximity sensor. Other types of sensors may be used in alternative embodiments, such as pressure sensors.

The second clamp assembly 400 is coupled to a second side of the frame 224. The second clamp assembly 400 includes a second clamp mount 410, a second clamp actuator 420, a second part gripper 430, and a lateral positioner 450. The lateral positioner 450 is coupled to the frame 224. The second clamp mount 410 is used to mount the second clamp actuator 420 and the second part gripper 430 to the lateral positioner 450, such as using fasteners. The lateral positioner 450 is used to move the second part gripper 430 relative to the frame 224, such as in a lateral actuation direction 452. The lateral actuation direction 452 may be a vertical direction. The lateral actuation direction 452 may be in a direction toward/away from the upper surface 108 of the platform 104.

The second clamp actuator 420 is coupled to the second clamp mount 410. In various embodiments, the second clamp actuator 420 is a pneumatic actuator having flow ports 422, 424, which may be connected to pneumatic lines, to allow air flow through the second clamp actuator 420 to control operation of the second clamp actuator 420. In alternative embodiments, the second clamp actuator 420 is a hydraulic actuator or an electric actuator. The second part gripper 430 is coupled to the second clamp actuator 420. The second clamp actuator 420 is operated to actuate the second part gripper 430.

In an exemplary embodiment, the second part gripper 430 is used to mechanically pick up and hold the part 10, such as for movement of the part 10 from the parts feeder 102 to the assembly station at the processing machine 40. In the illustrated embodiment, the second part gripper 430 includes a first gripper jaw 432 and a second gripper jaw 434 that may be opened and closed relative to each other. A holding space 436 is defined between the first and second gripper jaws 432, 434. The part 10 may be held in the holding space 436 between the first and second gripper jaws 432, 434. In an exemplary embodiment, the second clamp actuator 420 is operated to cause the second part gripper 430 to pickup and release the part 10. The second clamp actuator 420 is operably coupled to the first gripper jaw 432 and/or the second gripper jaw 434 to open and close the second part gripper 430 for pickup and release of the part 10. Other types of grippers may be used in alternative embodiments to pick up and hold the part 10. For example, the second part gripper 430 may include vacuum elements used to hold the part 10 by vacuum pressure.

In an exemplary embodiment, the second clamp actuator 420 is operably coupled to the second part gripper 430 to move the second part gripper 430 between a releasing position and a holding position. For example, the first gripper jaw 432 and/or the second gripper jaw 434 may be moved toward each other as the second part gripper 430 is moved to the holding position. The second part gripper 430 is configured to hold the part 10 in the holding position. The first gripper jaw 432 and/or the second gripper jaw 434 may be moved away from each other as the second part gripper 430 is moved to the releasing position. The second part gripper 430 releases the part 10 when moved to the releasing position.

In an exemplary embodiment, the second clamp actuator 420 includes a gripper sensor 426 used for detecting a position of the second part gripper 430 relative to the part 10. The gripper sensor 426 may be provided in the holding space 436 between the gripper jaws 432, 434 to sense positions of the gripper jaw(s) 432, 434. The gripper sensor 426 may detect the presence of the part 10 in the holding space 436. The gripper sensor 426 may be a proximity sensor. Other types of sensors may be used in alternative embodiments, such as pressure sensors.

The lateral positioner 450 includes a base 454 and a carriage 456 slidably coupled to the base 454. The carriage 456 is movable in the lateral actuation direction 452. The base 454 is coupled to the frame 224. The second clamp mount 410 is coupled to, and movable with, the carriage 456. The lateral positioner 450 is operated to move the carriage 456, and thus the second part gripper 430, in the actuation direction 452 between a retracted position (shown in FIG. 3) and an extended position (shown in FIG. 7). The location of the second part gripper 430 relative to the first part gripper 330 changes as the second part gripper 430 moves between the retracted position and the extended position. In an exemplary embodiment, the second clamp assembly 400 includes a position sensor 458 determining a position of the lateral positioner 450. For example, the position sensor 458 may determine a position of the carriage 456 relative to the base 454. The position sensor 458 is used to determine a position of the second part gripper 430, such as to determine if the second part gripper 430 is in the retracted position or the extended position. In various embodiments, the first clamp assembly 300 may include a lateral positioner similar to the lateral positioner 450 to move the first part gripper 330 relative to the frame 224.

FIG. 6 is a rear view of a portion of the part manipulator 200 in accordance with an exemplary embodiment showing the second part gripper 430 in a retracted position. FIG. 7 is a rear view of a portion of the part manipulator 200 in accordance with an exemplary embodiment showing the second part gripper 430 in an extended position. The lateral positioner 450 is operated to move the second part gripper 430 between the retracted position and the advanced position. In the illustrated embodiment, the first part gripper 330 is fixed relative to the frame 224. In alternative embodiments, a lateral positioner may be provided between the first part gripper 330 and the frame 224 to move the first part gripper between a retracted position and an advanced position.

The gripper jaws 332, 334 of the first part gripper 330 are located a first distance 360 from the distal end 212 of the robot arm 210. In an exemplary embodiment, in the retracted position (FIG. 6), the gripper jaws 432, 434 of the second part gripper 430 are located a second distance 460 from the distal end 212 of the robot arm 210. The second distance 460 is less than the first distance 360. As such, the first part gripper 330 is able to interface with the parts 10 to pick up the first part 10a without the second part gripper 430 interfacing with the parts 10. The second part gripper 430 is in the retracted position to provide clearance and not interfere with the parts 10 as the part manipulator 200 maneuvers the first part gripper 330 into position to pick up the first part 10a. In an exemplary embodiment, in the extended position (FIG. 7), the gripper jaws 432, 434 of the second part gripper 430 are located a third distance 462 from the distal end 212 of the robot arm 210. The third distance 462 is greater than the second distance 460. In other words, the second part gripper 430 is located further from the distal end 212 of the robot arm 210 in the extended position compared to the retracted position. In an exemplary embodiment, the third distance 462 is greater than the first distance 360. In other words, the second part gripper 430 is located further from the distal end 212 of the robot arm 210 than the first part gripper 330 in the extended position. As such, the second part gripper 430 is able to interface with the parts 10 to pick up the second part 10b without the first part gripper 330 interfacing with the parts 10.

With reference back to FIG. 4, the first part gripper 330 is shown picking the first part 10a. The second part gripper 430 is shown in the retracted position, at the second distance 460 from the distal end 212 of the robot arm 210, in a clearance position so as to not interfere with the parts 10 and allow the first part gripper 330 to pick up the first part 10a.

Figure 8:
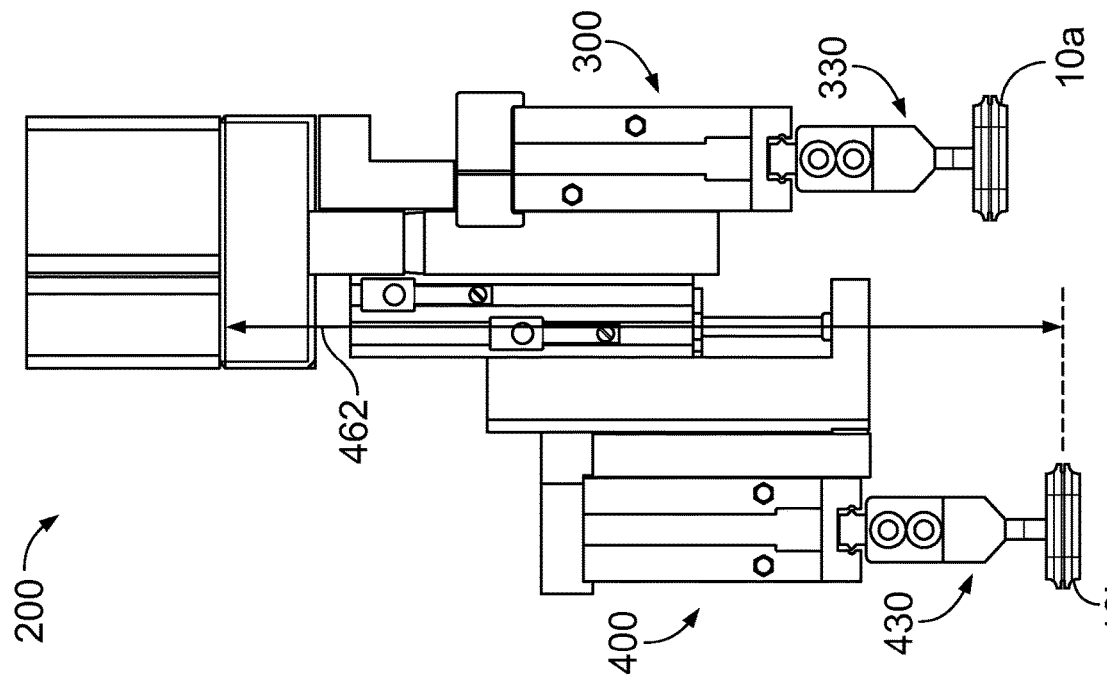
FIG. 8 is a front view of a portion of the part manipulator in accordance with an exemplary embodiment showing the second part gripper in the extended position.

FIG. 8 is a front view of a portion of the part manipulator 200 in accordance with an exemplary embodiment showing the second part gripper 430 in the extended position. The second part gripper 430 is shown picking the second part 10b. The second part gripper 430 is shown in the extended position, at the third distance 462 from the distal end 212 of the robot arm 210 to interface with the parts 10 to pick up the second part 10b without the first part gripper 330 interfacing with the parts 10. The first part gripper 330 is in a clearance position when the second part gripper 430 is in the extended position. Both part grippers 330, 430 hold the corresponding parts 10a, 10b. As such, multiple parts 10a, 10b are configured to be manipulated and moved by the part manipulator 200. Additional parts 10 may be moved by utilizing additional part grippers (for example, additional clamp assemblies). The part manipulator 200 improves efficiency by picking multiple parts 10a, 10b and simultaneously transitioning the multiple parts 10a, 10b by reducing the number of transitions into/out of the parts feeder 102 and/or the processing machine 40. In various embodiments, the part manipulator 200 may improve cycle time up to 80% compared to part manipulators that move a single part.

Figure 9:
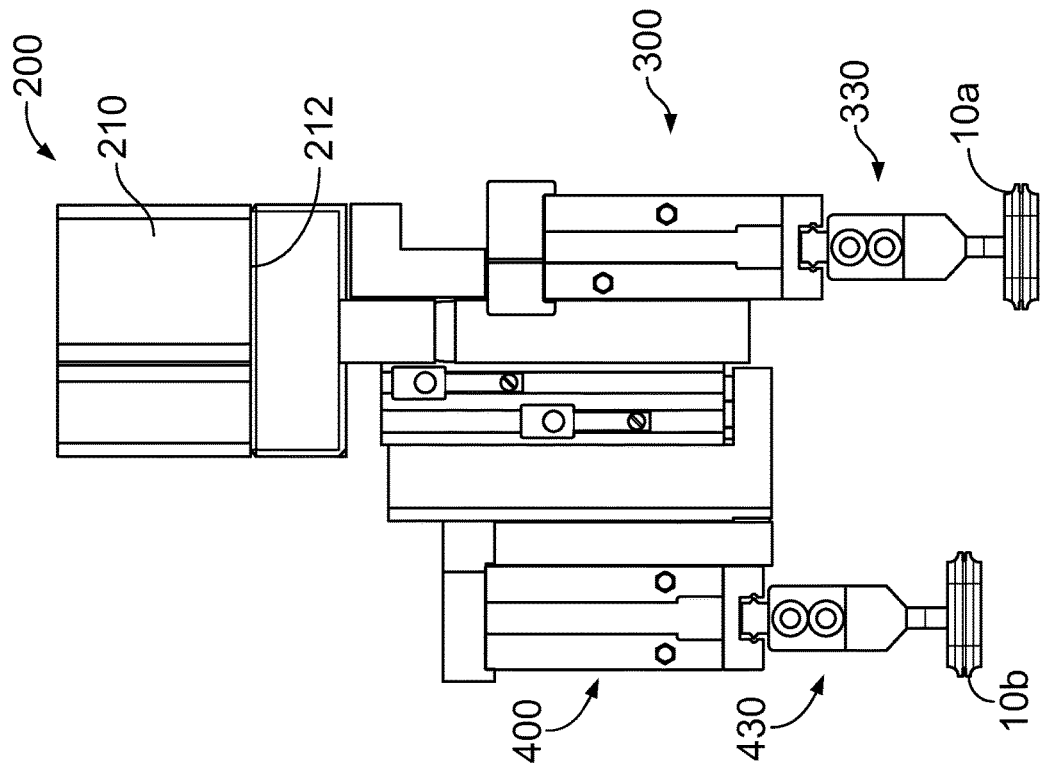
FIG. 9 is a front view of a portion of the part manipulator 200 in accordance with an exemplary embodiment showing the second part gripper 430 in the retracted position.

FIG. 9 is a front view of a portion of the part manipulator 200 in accordance with an exemplary embodiment showing the second part gripper 430 in the retracted position. The first part gripper 330 is shown holding the first part 10a. The second part gripper 430 is shown holding the second part 10b. The part manipulator 200 is operated to move both of the parts 10a, 10b to a different location, such as to the place station 44 (shown in FIG. 1). Both parts 10a, 10b may be released at the place station 44. In other embodiments, the part manipulator 200 may move to the place station 44 with the second part gripper 430 in the extended position (FIG. 8) rather than the retracted position (FIG. 9).

Figure 10:
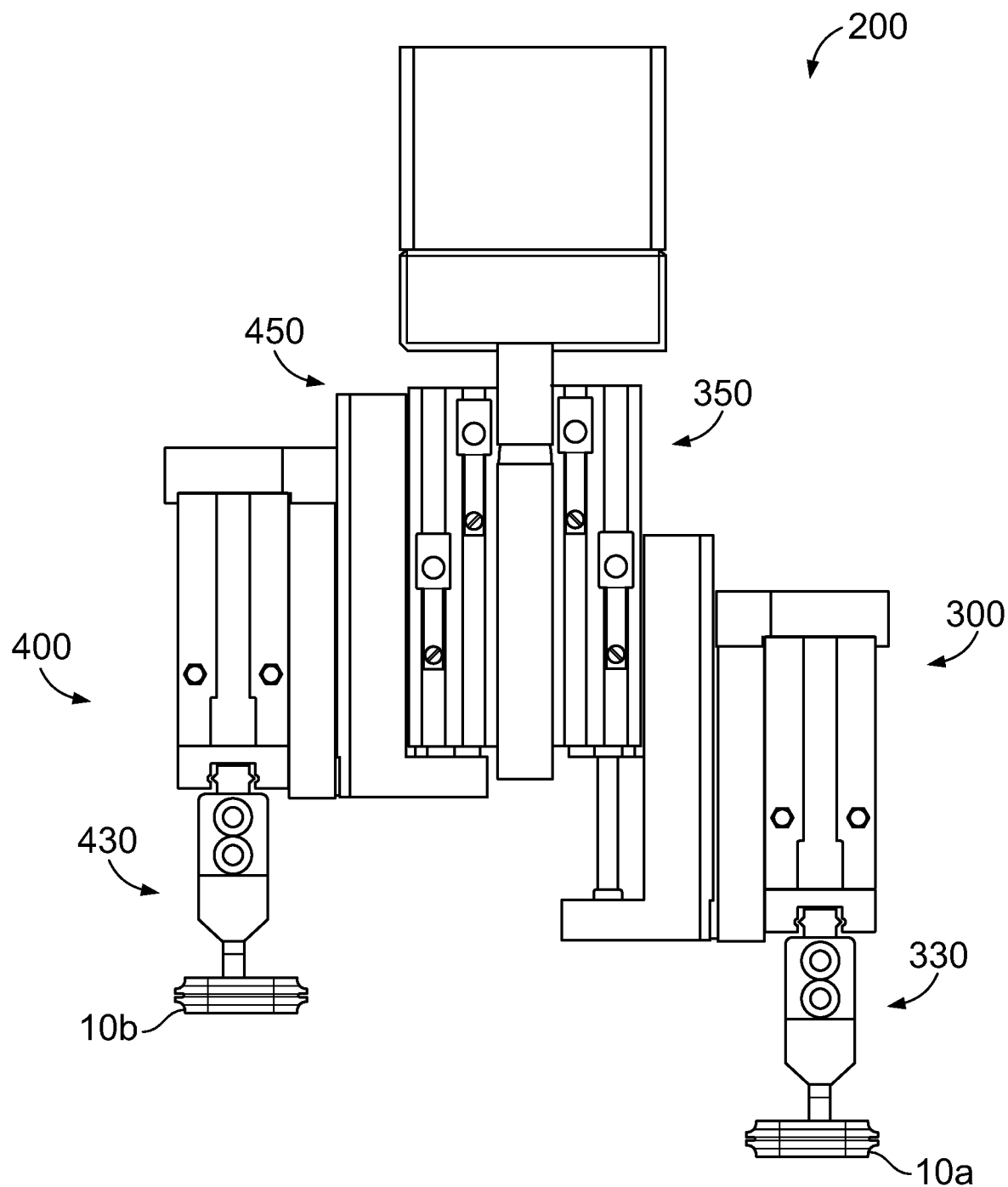
FIG. 10 is a front view of a portion of the part manipulator in accordance with an exemplary embodiment.

FIG. 10 is a front view of a portion of the part manipulator 200 in accordance with an exemplary embodiment. In the illustrated embodiment, both the first clamp assembly 300 and the second clamp assembly 400 include lateral positioners 350, 450, respectively. The first part gripper 330 is movable relative to the distal end 212 of the robot arm 210 between a retracted position and an extended position. The first part gripper 330 is shown in an extended position in the illustrated embodiment. The second part gripper 430 is shown in the retracted position. The second part gripper 430 is in a clearance position when the first part gripper 330 is in the extended position to avoid interference when picking the parts 10a, 10b. Multiple parts 10a, 10b are configured to be manipulated and moved by the part manipulator 200.

Figure 11:
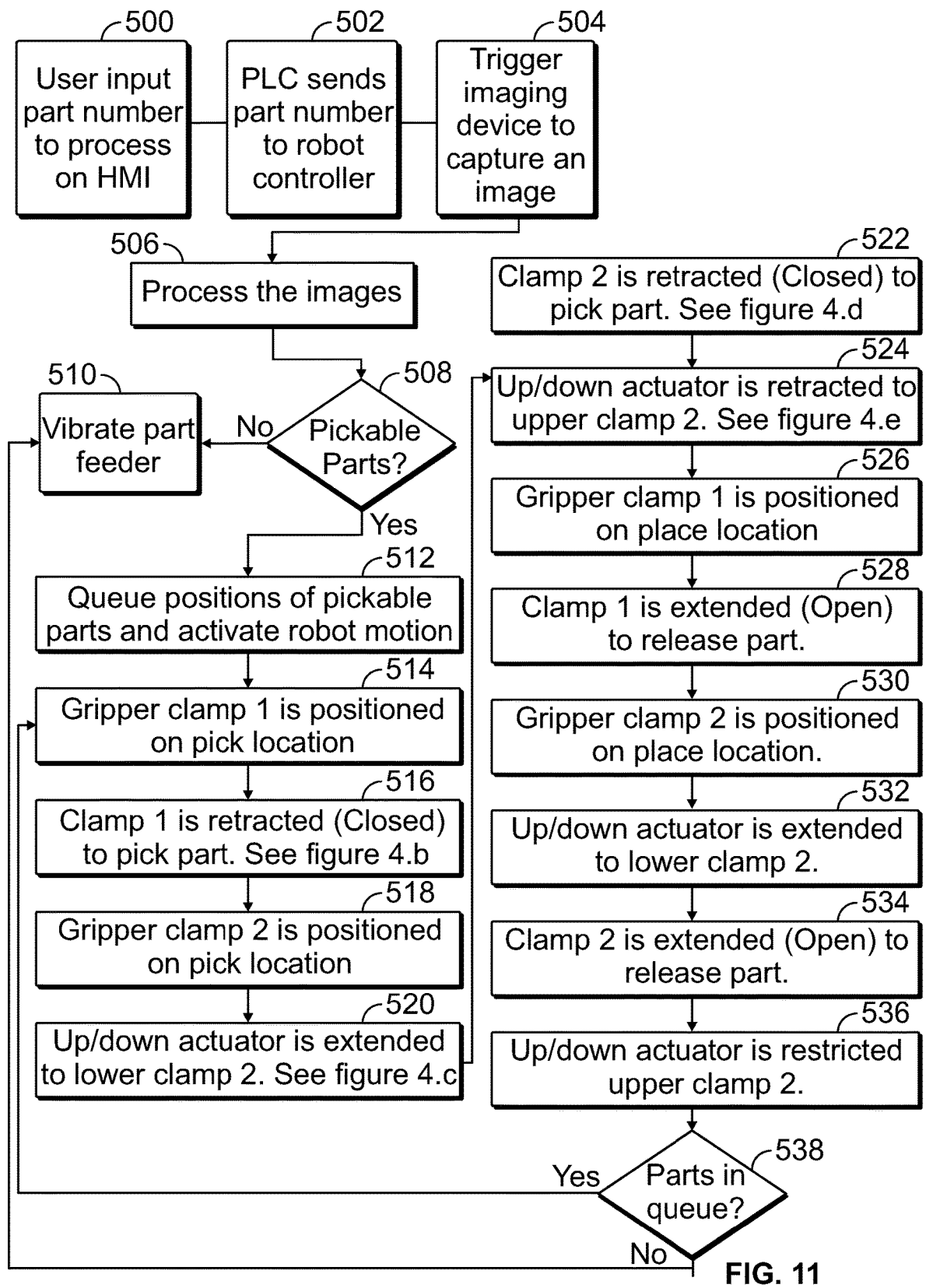
FIG. 11 is a flow chart showing a method of assembling parts in accordance with an exemplary embodiment.

FIG. 11 is a flow chart showing a method of assembling parts in accordance with an exemplary embodiment. The method, at 500, includes inputting the part numbers or type of parts being assembled by the part assembly machine. The user may manually enter the part numbers or select the type of parts being assembled, such as into a user interface of the part assembly machine. The parts are loaded onto the platform of the parts feeder.

At 502, the method includes sending control signals to the part manipulator based on the type of parts being assembled. The control signals control positioning of the part manipulator relative to the platform. For example, the control signals control the vertical positioning of the part manipulator (for example, the end effector of the part manipulator) for picking up the parts based on the type of parts being assembled.

At 504, the controller triggers the imaging device to capture an image of the parts on the platform of the parts feeder. At 506, the controller processes the images. The image is analyzed by the controller to determine positions and/or orientations of each of the parts. The imaging may be performed quickly and efficiently using the imaging device. The image may be processed using an image analysis model, which is based on the type of parts being assembled. The image analysis model may include a shape recognition tool to determine locations and orientations of the parts. In various embodiments, the images are processed by performing pattern recognition of the images based on the image analysis model. In various embodiments, the images are processed by performing feature extraction of boundaries and surfaces detected in the images and comparing the boundaries and surfaces to the image analysis model.

At 508, the controller determines if there are any pickable parts based on the image analysis. The controller determines the number of pickable parts and determines the locations of the pickable parts. At 510, if there are no pickable parts, the controller sends a signal to the parts feeder to vibrate the parts feeder to flip the parts on the platform and change the positions/orientations of the parts on the platform. After the parts feeder is vibrated, the method returns to step 504 to trigger the camera to capture another image. At 512, if there are pickable parts, the controller queues the positions (x, y, z) of each of the pickable parts to the parts manipulator and activates motion of the part manipulator.

At 514, the controller positions the first part gripper above the first part for part pick-up. The controller causes the robot arm to move to a first pick-up staging position. The pick-up staging position may be aligned vertically above the first part. The gripper jaws of the first part gripper are open and aligned with the first part. At 516, the controller operates the first clamp actuator to close the gripper jaws. The gripper jaws are closed on the first part to hold the first part in the first part gripper.

At 518, the controller positions the second part gripper above the second part for part pick-up. The controller causes the robot arm to move to a second pick-up staging position. The second pick-up staging position may be aligned vertically above the second part. The gripper jaws of the second part gripper are open. At 520, the lateral positioner is operated to move the second part gripper from the retracted position to the extended position. The second part gripper is moved downward toward the platform holding the second part. The second part gripper is moved to align the gripper jaws of the second part gripper with the second part. At 522, the controller operates the second clamp actuator to close the gripper jaws. The gripper jaws are closed on the second part to hold the second part in the second part gripper. At 524, the lateral positioner is operated to move the second part gripper from the extended position to the advanced position. The second part gripper is moved upward away from the platform.

At 526, the controller causes the part manipulator to move to a placement position. In an exemplary embodiment, the first part may be positioned at the placement position. The robot arm moves the multiple parts held by the part manipulator to the place station. The controller may cause the robot arm to move to the place station. The controller may causes the robot arm to move to the processing machine, such as to an assembly station. For example, the parts may be assembled with other parts at an assembly machine, such as loading contacts or gaskets into the connector housing. The parts may be attached to another part, such as mounting the parts to a circuit board. At 528, the first part is released at the place location. The first clamp actuator is operated to open the gripper jaws to release the first part. At 530, the controller causes the part manipulator to move to a second placement position. The second part may be positioned at the second placement position. At 532, the lateral positioner is operated to move the second part gripper from the retracted position to the extended position. The second part gripper is moved downward toward the place station to move the second part into position. At 534, the second part is released at the second place location. The second clamp actuator is operated to open the gripper jaws to release the second part. At 536, the lateral positioner is operated to move the second part gripper from the extended position back to the retracted position.

At 538, the controller determines if there are additional pickable parts in the queue. If there are additional parts in the queue, the controller triggers a return to step 514 and positions the first part gripper above the part for part pick-up. If there are no pickable parts in the queue, the controller triggers a return to step 510 vibrate the parts feeder to change the positions/orientations of the parts on the platform. After the parts feeder is vibrated, the method returns to step 504 to trigger the camera to capture another image.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A part manipulator comprising:
a robot arm movable in three dimensional space, the robot arm movable between a pick station and a place station;
an end effector coupled to a distal end of the robot arm, the end effector including a frame, a first clamp assembly coupled to the frame, and a second clamp assembly coupled to the frame, the first clamp assembly including a first part gripper configured to pick a first part, the first part gripper located a first distance from the distal end of the robot arm to pick the first part, the second clamp assembly including a second part gripper configured to pick a second part, wherein the second part gripper is movable relative to the frame in an actuation direction between a retracted position and an extended position, the second part gripper being located a second distance from the distal end of the robot arm in the retracted position, the second distance being less than the first distance, the second part gripper being located a third distance from the distal end of the robot arm in the extended position, the third distance being greater than the second distance, wherein the second part gripper is configured to pick the second part when the second part gripper is in the extended position.

2. The part manipulator of claim 1, wherein the end effector moves both the first and second parts between the pick station and the place station.

3. The part manipulator of claim 1, wherein the first part gripper is fixed relative to the frame.

4. The part manipulator of claim 1, wherein the second part gripper is movable relative to the first part gripper to pick the second part.

5. The part manipulator of claim 1, wherein the third distance is greater than the first distance.

6. The part manipulator of claim 1, wherein the second part gripper is located above the first part gripper in the retracted position, the second part gripper being located below the first part gripper in the extended position.

7. The part manipulator of claim 1, wherein the first part gripper is movable relative to the frame in an actuation direction between a retracted position and an extended position, the first part gripper being located at the first distance from the distal end of the robot arm in the retracted position, the first part gripper being located a fourth distance from the distal end of the robot arm in the extended position, the fourth distance being greater than the first distance, wherein the first part gripper is configured to pick the first part when the first part gripper is in the extended position.

8. The part manipulator of claim 1, wherein the second clamp assembly includes a lateral positioner coupled to the frame, the lateral positioner being coupled to the second part gripper and operated to move the second part gripper between the retracted position and the extended position.

9. The part manipulator of claim 1, wherein the second clamp assembly includes a position sensor determining a position of the second part gripper.

10. The part manipulator of claim 1, wherein the first clamp assembly includes a first clamp actuator operably coupled to the first part gripper to move the first part gripper between a releasing position and a holding position, the first part gripper configured to hold the first part in the holding position, the second clamp assembly includes a second clamp actuator operably coupled to the second part gripper to move the second part gripper between a releasing position and a holding position, the second part gripper configured to hold the second part in the holding position.

11. A part assembly machine comprising:
a pick station having a part feeder, the part feeder having a platform supporting parts including a first part and a second part;
a vision inspection station positioned adjacent the part feeder, the vision inspection station including an imaging device to image the first part and the second part in a field of view above the platform;
a controller receiving images from the imaging device, the controller determining locations of the first part and the second part on the platform; and
a part manipulator positioned adjacent the pick station to successively pick up the first part and the second part from the part feeder and configured to successively place the first part and the second part at a place station, the part manipulator including a robot arm and an end effector coupled to a distal end of the robot arm, the robot arm operably coupled to the controller, the robot arm movable in three dimensional space between the pick station and the place station, the end effector operably coupled to the controller, the end effector including a frame, a first clamp assembly coupled to the frame, and a second clamp assembly coupled to the frame, the first clamp assembly including a first part gripper configured to pick the first part, the first part gripper located a first distance from the distal end of the robot arm to pick the first part, the second clamp assembly including a second part gripper configured to pick the second part, wherein the second part gripper is movable relative to the frame in an actuation direction between a retracted position and an extended position, the second part gripper being located a second distance from the distal end of the robot arm in the retracted position, the second distance being less than the first distance, the second part gripper being located a third distance from the distal end of the robot arm in the extended position, the third distance being greater than the second distance, wherein the second part gripper is configured to pick the second part when the second part gripper is in the extended position;
wherein the controller operates the robot arm to successively position the end effector relative to the first part and the second part;
wherein the controller operates the first clamp assembly to pick up the first part at the pick station when the first part gripper is aligned with the first part;
wherein the controller operates the second clamp assembly to move the second part gripper to the extended position to pick up the second part at the pick station when the second part gripper is aligned with the second part;
wherein the controller operates the robot arm to move the end effector to the place station after the first part and the second part are picked up; and
wherein the controller operates the end effector to successively release the first part and the second part at the place station.

12. The part assembly machine of claim 11, wherein the end effector moves both the first and second parts between the pick station and the place station.

13. The part assembly machine of claim 11, wherein the first part gripper is fixed relative to the frame.

14. The part assembly machine of claim 11, wherein the second part gripper is movable relative to the first part gripper to pick the second part.

15. The part assembly machine of claim 11, wherein the second part gripper is located above the first part gripper in the retracted position, the second part gripper being located below the first part gripper in the extended position.

16. The part assembly machine of claim 11, wherein the second clamp assembly includes a lateral positioner coupled to the frame, the lateral positioner being coupled to the second part gripper and operated to move the second part gripper between the retracted position and the extended position.

17. A method of assembling parts comprising:
loading parts, including a first part and a second part, on an upper surface of a platform of a part feeder;
imaging the first part and the second part on the platform using an imaging device;
processing images to determine positions of the first part and the second part on the platform;
successively picking up the first part and the second part using a part manipulator including a robot arm movable in three dimensional space and an end effector coupled to a distal end of the robot arm that includes a frame, a first clamp assembly coupled to the frame to pick the first part, and a second clamp assembly coupled to the frame to pick the second part, the first clamp assembly including a first part gripper located a first distance from the distal end of the robot arm, the second clamp assembly including a second part gripper movable relative to the frame in an actuation direction between a retracted position and an extended position, the second part gripper being located a second distance less than the first distance from the distal end of the robot arm in the retracted position, the second part gripper being located a third distance greater than the second distance from the distal end of the robot arm in the extended position;

operating the robot arm to move the end effector and the first and second parts to a place station; and operating the end effector to release the first and second parts at the place station.

18. The method of claim 17, wherein said successively picking up the first part and the second part comprises:

positioning the second part gripper in the retracted position when the first part is picked up by the first part gripper; and positioning the second part gripper in the extended position when the second part is picked up by the second part gripper.

19. The method of claim 17, wherein said successively picking up the first part and the second part comprises:

moving the robot arm to align the first part gripper with the first part based on the images to pick up the first part; and moving the robot arm to align the second part gripper with the second part based on the images to pick up the second part.

20. The method of claim 17, further comprising:

vibrating the parts to change orientations of the parts on the upper surface of the platform;

reimaging the parts; and processing new images of the parts to determine new orientations of the parts.

* * * * *